US008872380B2

(12) United States Patent
Shim

(10) Patent No.: US 8,872,380 B2
(45) Date of Patent: Oct. 28, 2014

(54) ENERGY STORAGE SYSTEM

(75) Inventor: Kyung-Sub Shim, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 644 days.

(21) Appl. No.: 13/082,827

(22) Filed: Apr. 8, 2011

(65) Prior Publication Data

US 2012/0068545 A1     Mar. 22, 2012

(30) Foreign Application Priority Data

Sep. 16, 2010   (KR) .................. 10-2010-0091100

(51) Int. Cl.
*H02J 1/00*       (2006.01)
*H01M 10/48*    (2006.01)
*H01M 10/42*    (2006.01)
*H02J 7/00*       (2006.01)

(52) U.S. Cl.
CPC .......... *H01M 10/486* (2013.01); *H01M 10/482* (2013.01); *H01M 2200/105* (2013.01); *Y02E 60/12* (2013.01); *H01M 10/425* (2013.01); *H02J 7/0029* (2013.01); *H01M 2200/106* (2013.01)
USPC ................... 307/80; 307/64; 307/66; 307/82; 307/87; 320/107; 320/116; 320/119; 324/522; 324/434

(58) Field of Classification Search
USPC .......... 307/80, 64, 23, 43, 44, 65, 66, 85, 87, 307/46; 324/522, 434, 426; 320/107, 116, 320/126, 150, 154, 134
See application file for complete search history.

(56) References Cited

U.S. PATENT DOCUMENTS 5,674,008 A    10/1997  Allinson
6,215,202 B1 *  4/2001  Luongo et al. ................. 307/64

(Continued)

FOREIGN PATENT DOCUMENTS

JP    54-128489    9/1979
JP    08-313367    11/1996

(Continued)

OTHER PUBLICATIONS

Japanese Office Action issued on Apr. 23, 2013 by JPO in connection with Japanese Patent Application No. 2011-150750 which also claims Korean Patent Application No. 10-2010-0091100 and Request for Entry of the Accompanying Office Action attached herewith.

(Continued)

*Primary Examiner* — Jared Fureman
*Assistant Examiner* — Jagdeep Dhillon
(74) *Attorney, Agent, or Firm* — Robert E. Bushnell, Esq.

(57) ABSTRACT

An energy storage system includes a plurality of battery units; a plurality of thermistors detecting a temperature of the plurality of battery units; a multiplexer performing multiplexing on the plurality of thermistors, and connecting a thermistor selected from among the plurality of thermistors to a reference resistor; a power switch unit arranged between the reference resistor and a power voltage terminal; and a control signal input unit receiving a control signal applied to the multiplexer and the power switch unit, and receiving two or more control bits contained in the control signal. In the energy storage system, a temperature measurement operation is performed at a plurality of measurement positions, whereby a current state of a battery may be accurately detected, an entire circuit may be reduced and simplified, and low power consumption may be realized.

19 Claims, 3 Drawing Sheets

(56) References Cited

U.S. PATENT DOCUMENTS

| | | | |
|---|---|---|---|
| 7,262,605 B2* | 8/2007 | Seo et al. | 324/522 |
| 7,497,615 B2 | 3/2009 | Kim et al. | |
| 7,649,336 B2* | 1/2010 | Gamboa et al. | 320/107 |
| 7,714,463 B2 | 5/2010 | Su et al. | |
| 8,410,634 B2* | 4/2013 | Park | 307/65 |
| 2002/0169523 A1 | 11/2002 | Ross et al. | |
| 2005/0231169 A1 | 10/2005 | Seo et al. | |
| 2006/0132102 A1 | 6/2006 | Harvey | |
| 2007/0029976 A1 | 2/2007 | Garcia et al. | |
| 2008/0272653 A1 | 11/2008 | Inoue et al. | |
| 2009/0080226 A1 | 3/2009 | Fornage | |
| 2009/0189574 A1 | 7/2009 | Le et al. | |

FOREIGN PATENT DOCUMENTS

| | | |
|---|---|---|
| JP | 10023671 A | 1/1998 |
| JP | 11-299122 A | 10/1999 |
| JP | 2000-014025 A | 1/2000 |
| JP | 2001-268800 | 9/2001 |
| JP | 2004-180467 | 6/2004 |
| JP | 2005-224071 | 8/2005 |
| JP | 2005-287091 A | 10/2005 |
| JP | 2006-288002 A | 10/2006 |
| JP | 2007-215257 | 8/2007 |
| JP | 2009033797 | 2/2009 |
| JP | 2009052991 | 3/2009 |
| JP | 2009109271 | 5/2009 |
| JP | 2009-153338 | 7/2009 |
| KR | 1998-043956 | 9/1998 |
| KR | 10-2003-0038507 | 5/2003 |
| KR | 10-2006-0007935 | 1/2006 |
| KR | 10-0648135 | 11/2006 |
| KR | 10-2008-0044676 | 5/2008 |
| KR | 10-2009-0036751 | 4/2009 |

OTHER PUBLICATIONS

Korean Office action issued on Jul. 2, 2012 by the Korean Patent Office in the corresponding Korean Patent Application No. 10-2010-0091100.

Korean Office action issued by KIPO on Apr. 21, 2011 corresponding to Korean Application No. 10-2009-0130024 (cited in the IDS filed on Jun. 7, 2011 of the related U.S. Appl. No. 12/950,077), together with Request for Entry.

Korean Office action issued on Sep. 23, 2011 by Korean Patent Office, Corresponding to Korean Patent application No. 10-2010-0091100, together with "Request for Entry".

Japanese Office action issued on Jan. 8, 2013 in the corresponding Japanese patent application No. 2011-150750.

European Search Report issued on Jan. 3, 2012 in connection with European Patent Application Serial No. 11 181 283.0, which also claims Korean Patent Application Serial No. 10-2010-0091100 as its priority document.

The extended European Search Report issued on May 12, 2014 by EPO in connection with European Patent Application No. 10857041.7 which corresponds to PCT/KR2010/007438. (Cited in the Information Disclosure Statement of cross-referenced U.S. Appl. No. 13/820,948: P59323, which was filed on Jun. 11, 2014).

* cited by examiner

ENERGY STORAGE SYSTEM

CLAIM OF PRIORITY

This application makes reference to, incorporates the same herein, and claims all benefits accruing under 35 U.S.C. §119 from an application earlier filed in the Korean Intellectual Property Office on 16 Sep. 2010 and there duly assigned Serial No. 10-2010-0091100.

BACKGROUND OF THE INVENTION

1. Field of the Invention

One or more embodiments of the present invention relate to an energy storage system.

2. Description of the Related Art

Due to problems of environmental destruction, resource exhaustion, and the like, there is increasing demand for a system capable of efficiently using stored power. Also, there is increasing demand for renewable energy that does not cause pollution during power generation. An energy storage system is a system that connects renewable energy, a power storing battery, and existing power from a grid, and many researches have been conducted to adapt the energy storage system to environmental changes.

SUMMARY OF THE INVENTION

One or more embodiments of the present invention relate to an energy storage system capable of accurately detecting a current state of a battery by measuring temperature at a plurality of measurement positions, whereby an entire circuit may be reduced and simplified and low power consumption may be realized.

Additional aspects will be set forth in part in the description which follows and, in part, will be apparent from the description, or may be learned by practice of the presented embodiments.

In accordance with one or more embodiments of the present invention, an energy storage system may include a plurality of battery units; a plurality of thermistors detecting a temperature of the plurality of battery units; a multiplexer performing multiplexing on the plurality of thermistors, and connecting a thermistor selected from among the plurality of thermistors to a reference resistor; a power switch unit arranged between the reference resistor and a power voltage terminal; and a control signal input unit receiving a control signal applied to both the multiplexer and the power switch unit, and the control signal input unit receiving two or more control bits contained in the control signal.

The energy storage system may further include a first transmission line delivering the control signal and extending from the control signal input unit to the power switch unit, and a second transmission line extending from the control signal input unit to the multiplexer.

The first transmission line and the second transmission line may deliver a substantially same control signal to the power switch unit or to the multiplexer.

The first transmission line and the second transmission line may include two or more data lines for transmitting control bits, respectively.

The first transmission line and the second transmission line may diverge from the control signal input unit and may extend to the power switch unit and the multiplexer, respectively.

The control signal may be continuously changed so as to sequentially change a thermistor to be selected by the multiplexer.

The control signal may indicate the multiplexer to select a particular thermistor, and may simultaneously indicate an ON operation of the power switch unit.

The control signal may indicate the multiplexer not to select a thermistor, and may simultaneously indicate an OFF operation of the power switch unit.

The power switch unit may include one or more switches that are turned on or off according to a signal containing the control bits.

The power switch unit may include a first power switch being turned on or off according to signals containing the control bits; and a second power switch opening and closing a circuit between the reference resistor and the power voltage terminal by operating in conjunction with an ON or OFF operation of the first power switch.

The power switch unit may further include a calculation unit for combining the signals containing the control bits and then outputting a signal to the first power switch.

The calculation unit may receive the control bits and then may perform an OR operation.

The calculation unit may include two or more data lines that respectively receive the control bits, and the two or more data lines are respectively connected in series with diodes and have outputs connected to each other.

In accordance with one or more embodiments of the present invention, an energy storage system may supply power to a load; in conjunction with a power generating system and a grid. The energy storage may include a battery including a plurality of battery units, and a plurality of thermistors for detecting a temperature of the plurality of battery units; a temperature detecting unit performing multiplexing on the plurality of thermistors, sequentially distributing power voltage, by using a reference resistor, to the plurality of thermistors, and outputting a divided voltage; and a control unit connected to and communicating with the temperature detecting unit.

The temperature detecting unit may include a multiplexer performing multiplexing on the plurality of thermistors, and connecting a thermistor selected from the plurality of thermistors to the reference resistor; a power switch unit arranged between the reference resistor and a power voltage terminal; and a control signal input unit for receiving a control signal with respect to the multiplexer and the power switch unit.

The multiplexer and the power switch unit may receive a substantially same control signal.

The power switch unit may include one or more switches that are turned on or off according to the control signal.

The power switch unit may include a calculation unit combining bits of the control signal and then outputting a signal having a high-level or a low-level; a first power switch turned on or off according to an output from the calculation unit; and a second power switch opening and closing a circuit between the reference resistor and the power voltage terminal by operating in conjunction with an ON or OFF operation of the first power switch.

The energy storage system may further include a power converting unit converting a voltage output from a power generating system into a direct current (DC) link voltage; a bidirectional converter converting an output voltage of the battery into the DC link voltage or converting the DC link voltage into the input voltage of the battery; a DC link unit constantly maintaining a level of the DC link voltage; a bidirectional inverter converting the DC link voltage into an alternating current (AC) voltage appropriate for the grid, and converting the AC voltage into the DC link voltage; and an integrated controller controlling the power converting unit, the bidirectional converter, and the bidirectional inverter.

The integrated controller may control an operation mode with respect to a flow of a current in the energy storage system, and the control unit may control charging and discharging operations of the battery according to a control of the integrated controller.

BRIEF DESCRIPTION OF THE DRAWINGS

A more complete appreciation of the invention, and many of the attendant advantages thereof will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Reference will now be made in detail to embodiments, examples of which are illustrated in the accompanying drawings.

Figure 1:
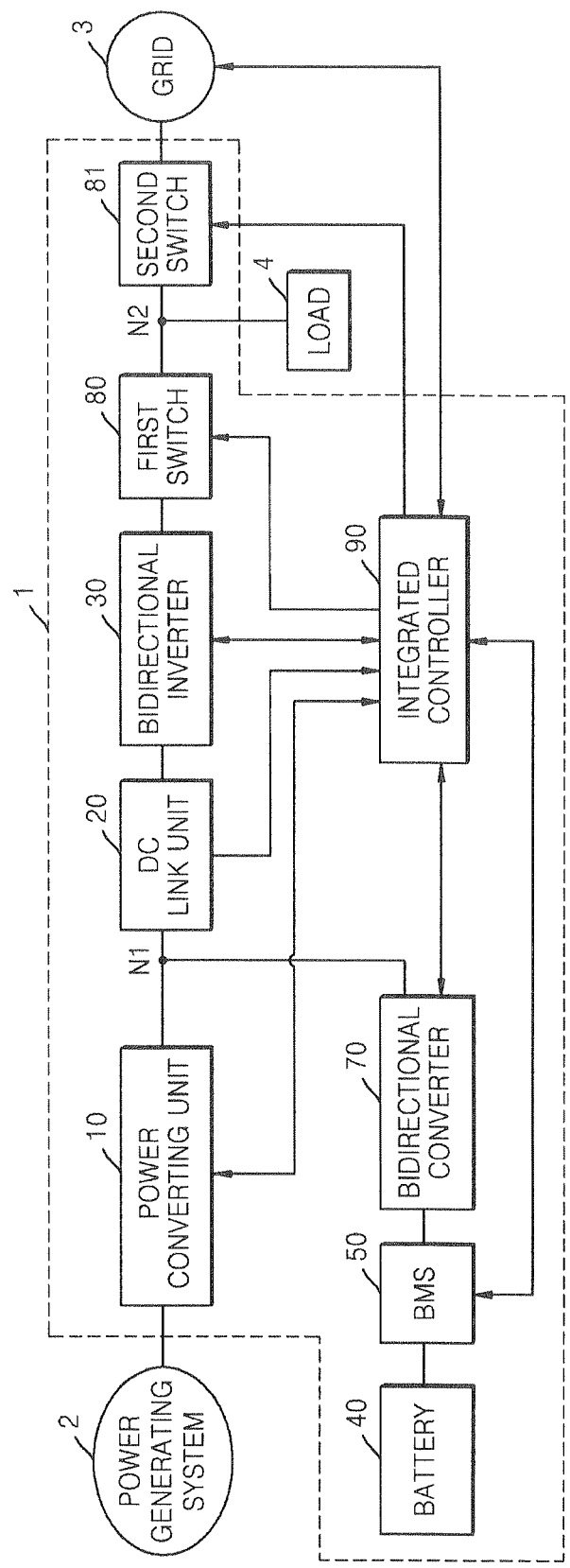
FIG. 1 is a block diagram of a structure of an energy storage system constructed as an embodiment of the present invention.

FIG. 1 is a block diagram of a structure of an energy storage system 1 constructed as an embodiment of the present invention. Referring to FIG. 1, the energy storage system 1 supplies power to a load 4, in conjunction with a power generating system 2 and a grid 3.

The power generating system 2 is a system for generating power by using an energy source, and supplies the generated power to the energy storage system 1. The power generating system 2 may be a solar power generating system, a wind power generating system, a tidal power generating system, or the like, and in addition to these systems, the power generating system 2 may include power generating systems for generating power by using a renewable energy including solar heat, terrestrial heat, or the like. In particular, a solar cell that generates electric energy by using solar rays may be easily installed in a house or a factory and thus the solar cell is appropriate to be applied to the energy storage system 1, which may be distributed to individual houses. The power generating system 2 may include a plurality of power generating modules arranged in parallel with each other, and generates power via each of the power generating modules, so that the power generating system 2 may be a large capacity energy system.

The grid 3 may include a power generating station, a substation, a power transmission line, and the like. When the grid 3 is in a normal state, the grid 3 supplies power to the energy storage system 1 or to the load 4, or receives power from the energy storage system 1. When the grid is in an abnormal state, a power supply from the grid 3 to the energy storage system 1 or to the load 4 is stopped, and a power supply from the energy storage system 1 to the grid 3 is also stopped. In one embodiment, the grid 3 may be both a controller controlling the flow of electric current and a power generator.

The load 4 may consume power generated by the power generating system 2, power stored in a battery 40, or power supplied from the grid 3, and the load 4 may be a house, a factory, or the like.

The energy storage system 1 may store power generated by the power generating system 2 in the battery 40, or may send the power generated by the power generating system 2 to the grid 3. Also, the energy storage system 1 may deliver power stored in the battery 40 to the grid 3, or may store power supplied from the grid 3 in the battery 40. In addition, in an abnormal situation, e.g., when a power failure occurs in the grid 3, the energy storage system 1 may perform an Uninterruptible Power Supply (UPS) operation and then supply power to the load 4. When the grid 3 is in the normal state, the energy storage system 1 may supply power generated by the power generating system 2 or the power stored in the battery 40 to the load 4.

The energy storage system 1 includes a power converting unit 10, a direct current (DC) link unit 20, a bidirectional inverter 30, the battery 40, a battery management system (BMS) 50, a bidirectional converter 70, a first switch 80, a second switch 81, and an integrated controller 90.

The power converting unit 10 is electrically connected between the power generating system 2 and a first node N1. The power converting unit 10 delivers power generated by the power generating system 2 to the first node N1, and converts an output voltage into a DC link voltage. According to the power generating system 2, the power converting unit 10 may be formed as a converter or a rectifier circuit. In a case where the power generating system 2 generates DC power, the power converting unit 10 may function as a converter for converting DC power into a DC link voltage. Conversely, in a case where the power generating system 2 generates AC power, the power converting unit 10 may function as a rectifier circuit for converting AC power into DC power. In particular, when the power generating system 2 is a solar power generating system, the power converting unit 10 may be a maximum power point tracking (MPPT) converter for performing MPPT control so as to maximally obtain power generated by the power generating system 2 according to a change in solar radiation intensity, temperature, and the like.

The DC link unit 20 is electrically connected between the first node N1 and the bidirectional inverter 30, and constantly maintains the DC link voltage at the first node N1. Due to an instant voltage drop in the power generating system 2 or the grid 3 or a peak load occurrence in the load 4, a voltage level at the first node N1 may be unstable. However, it is necessary to constantly maintain a voltage at the first node N1 for stable operation of the bidirectional converter 70 and the bidirectional inverter 30. In this regard, the DC link unit 20 may be included for level stabilization of the DC link voltage at the first node N1, e.g., the DC link unit 20 may be embodied as a capacitor C. In the present embodiment, the DC link unit 20 is separately arranged. However, in another embodiment, the DC link unit 20 may be arranged within the bidirectional converter 70, or the bidirectional inverter 30, or the power converting unit 10. The DC link voltage indicates a consistent DC voltage maintained at a constant level between the first node N1 and the bi-directional inverter 30. Stabilizing the DC link voltage may be preferable for keeping the bi-directional converter 70 and bi-directional inverter 30 in normal operational modes.

The bidirectional inverter 30 is a power converter connected between the DC link unit 20 and the first switch 80. The bidirectional inverter 30 converts the DC link voltage output from the power generating system 2 or the battery 40 into an AC voltage appropriate for the grid 3, and then outputs the AC voltage. Also, in order to store power from the grid 3 in the battery 40, the bidirectional inverter 30 rectifies an AC voltage of the grid 3, converts the AC voltage into the DC link voltage, and then outputs the DC link voltage. The bidirectional inverter 30 may include a filter for removing a harmonic from the AC voltage output from the grid 3, and may include a phase locked loop (PLL) circuit for synchronizing a phase of an AC voltage output from the bidirectional inverter 30 with a phase of the AC voltage output from the grid 3 so as to prevent an occurrence of reactive power. In addition, the bidirectional inverter 30 may perform functions including restriction of a voltage variation range, power factor improvement, removal of a DC component, transient phenomenon protection, and the like.

The battery 40 receives and stores power generated by the power generating system 2 or power from the grid 3, and supplies stored power to the load 4 or the grid 3. The battery 40 may be formed of one or more battery units. The battery 40 may be formed of various types of battery units, e.g., a nickel-cadmium battery, a lead battery, a nickel metal hydrate (NiMH) battery, a lithium ion battery, a lithium polymer battery, or the like. The number of the battery units 40 may be determined according to an amount of power, a design condition, or the like, as requested by the energy storage system 1. For example, when power consumption of the load 4 is large, the energy storage system 1 may include a plurality of the battery units 40; when the power consumption of the load 4 is small, the energy storage system 1 may include only one battery 40.

The BMS 50 is electrically connected to the battery 40, and controls charging and discharging operations of the battery 40 according to control by the integrated controller 90. In order to protect the battery 40, the BMS 50 may perform an over-charge protection function, an over-discharge protection function, an over-current protection function, an over-voltage protection function, an over-heat protection function, a cell balancing function, and the like. For these functions, the BMS 50 may monitor a voltage, a current, the temperature, a remaining amount of power, the lifetime, a charge state, and the like of the battery 40, and may transmit related information to the integrated controller 90. In the present embodiment, the BMS 50 is separately arranged from the battery 40, but the BMS 50 and the battery 40 may be formed as an integrated battery pack.

The bidirectional converter 70 DC-DC converts a voltage of power output from the battery 40 into the DC link voltage, that is, a voltage level requested by the bidirectional inverter 30. Also, the bidirectional converter 70 DC-DC converts charge power input via the first node N1 into a voltage level requested by the battery 40. Here, the charge power may indicate power generated by the power generating system 2 or power supplied from the grid 3 via the bidirectional inverter 30.

The first switch 80 and the second switch 81 may be connected in series between the bidirectional inverter 30 and a second node N2, perform ON/OFF operations according to a control of the integrated controller 90, and thus control a flow of a current between the power generating system 2 and the grid 3. ON/OFF states of the first switch 80 and the second switch 81 may be determined according to states of the power generating system 2, the grid 3, and the battery 40. For example, in a case where the load 4 requires a large amount of power, both of the first switch 80 and the second switch 81 may be turned ON so that both power from the power generating system 2 and power from the grid 3 may be used. When the power from the power generating system 2 and the power from the grid 3 do not fulfill the amount of power requested by the load 4, power stored in the battery 40 may be used. On the other hand, when a power failure occurs in the grid 3, the second switch 81 may be turned OFF and the first switch 80 may be turned ON. By doing so, the power from the power generating system 2 or the power from the grid 3 may be supplied to the load 4, and thus it is possible to prevent a worker working on a power line of the grid 3 from being electrocuted by the power that has been supplied to the load 4 and then flowed to the grid 3.

The integrated controller 90 monitors the states of the power generating system 2, the grid 3, the battery 40, and the load 4, and controls the power converting unit 10, the bidirectional inverter 30, the BMS 50, the bidirectional converter 70, the first switch 80, and the second switch 81 according to a result of the monitoring. Also, the integrated controller 90 may monitor states of the energy storage system 1 and the load 4 by receiving a value of the DC link voltage from the DC link unit 20.

As described above, the BMS 50 detects state information related to the battery 40, transmits the state information to the integrated controller 90, and controls charging and discharging operations of the battery 40 according to the control of the integrated controller 90. The BMS 50 may detect the state information about a voltage, current, temperature, or the like from the battery unit 40. Hereinafter, a temperature measurement operation by the BMS 50 will be described.

Figure 2:
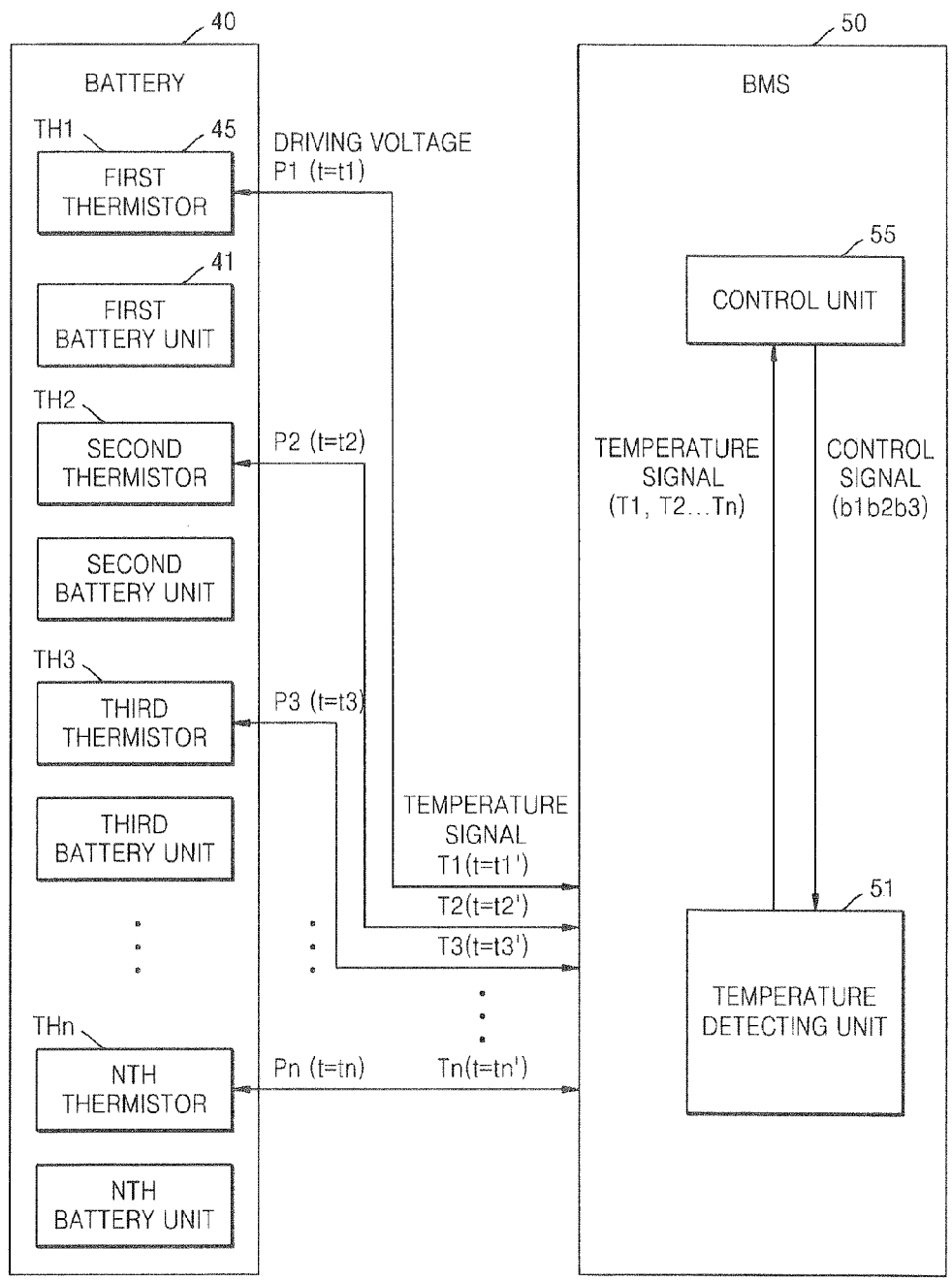
FIG. 2 illustrates a schematic configuration of a battery that is a measurement target, and a schematic configuration of a battery management system (BMS) that performs a temperature measurement operation on the battery.

FIG. 2 illustrates a configuration of the battery 40 that is a measurement target, and a configuration of the BMS 50 that performs a temperature measurement operation at different measurement positions of the battery 40. Referring to FIG. 2, the battery 40 includes a plurality of battery units 41 that are connected in series and parallel, and a plurality of thermistors 45 that perform a temperature measurement operation at different positions. The thermistors 45 are disposed in the vicinity of the battery units 41, respectively, and for example, the thermistors 45 transform temperature information of different battery units 41 into electrical signals and deliver them to the BMS 50.

As will be described later, driving powers are not simultaneously applied to the thermistors 45 but are sequentially applied to the thermistors 45. For example, power voltages P1, P2, P3, ..., Pn are sequentially applied to a first thermistor TH1, a second thermistor TH2, a third thermistor TH3, ..., an $n^{th}$ thermistor THn at different respective times t1, t2, t3, ..., tn. Accordingly, temperature signals T1, T2, T3, ..., Tn are sequentially output from the first thermistor TH1, the second thermistor TH2, the third thermistor TH3, ..., the $n^{th}$ thermistor THn at different respective times t1', t2', t3', ..., tn'. For example, the temperature signals T1, T2, T3, ..., Tn that are sequentially output from the first thermistor TH1, the second thermistor TH2, the third thermistor TH3, ..., the $n^{th}$ thermistor THn are delivered to the BMS 50.

The battery units 41 included in the battery 40 may be connected in series or in parallel to facilitate high output and high capacity performance, and serial/parallel connections may be used together, e.g., parallel blocks in which some of the battery units 41 are connected in parallel are connected in series.

The battery 40 includes the plurality of thermistors TH1, TH2, TH3, ..., THn for the temperature measurement operation at the different measurement positions. A temperature deviation may occur in the battery 40 due to arrangement of the battery units 41 included in the battery 40 having the high output and high capacity, so that the temperature measurement operation is performed at the different measurement positions so as to detect exact temperature information of each battery unit 41. With respect to the measurement positions of the thermistors TH1, TH2, TH3, ..., THn, one thermistor 45 may be arranged at every battery unit 41; or, a predetermined number of the battery units 41 may be set as one block and then one thermistor 45 may be arranged at every block. The thermistor 45 may be disposed in the vicinity of each of the battery units 41. For example, the thermistor 45 generates a voltage signal corresponding to a temperature of a measurement target, and may be formed as a resistance temperature sensor whose electrical resistance varies according to temperature. In one embodiment, one thermistor 45 may measure the temperature of one battery unit 41.

The BMS 50 includes a control unit 55 and a temperature detecting unit 51, wherein the control unit 55 controls the temperature measurement operation, and the temperature detecting unit 51 is electrically connected to and communicates with the control unit 55 so that the temperature detecting unit 51 sequentially distributes the power voltages P1, P2, P3, . . . , Pn to the thermistors TH1, TH2, TH3, . . . , THn according to a control signal from the control unit 55, and sequentially delivers the temperature signals T1, T2, T3, . . . , Tn of the thermistors TH1, TH2, TH3, . . . , THn to the control unit 55.

Figure 3:
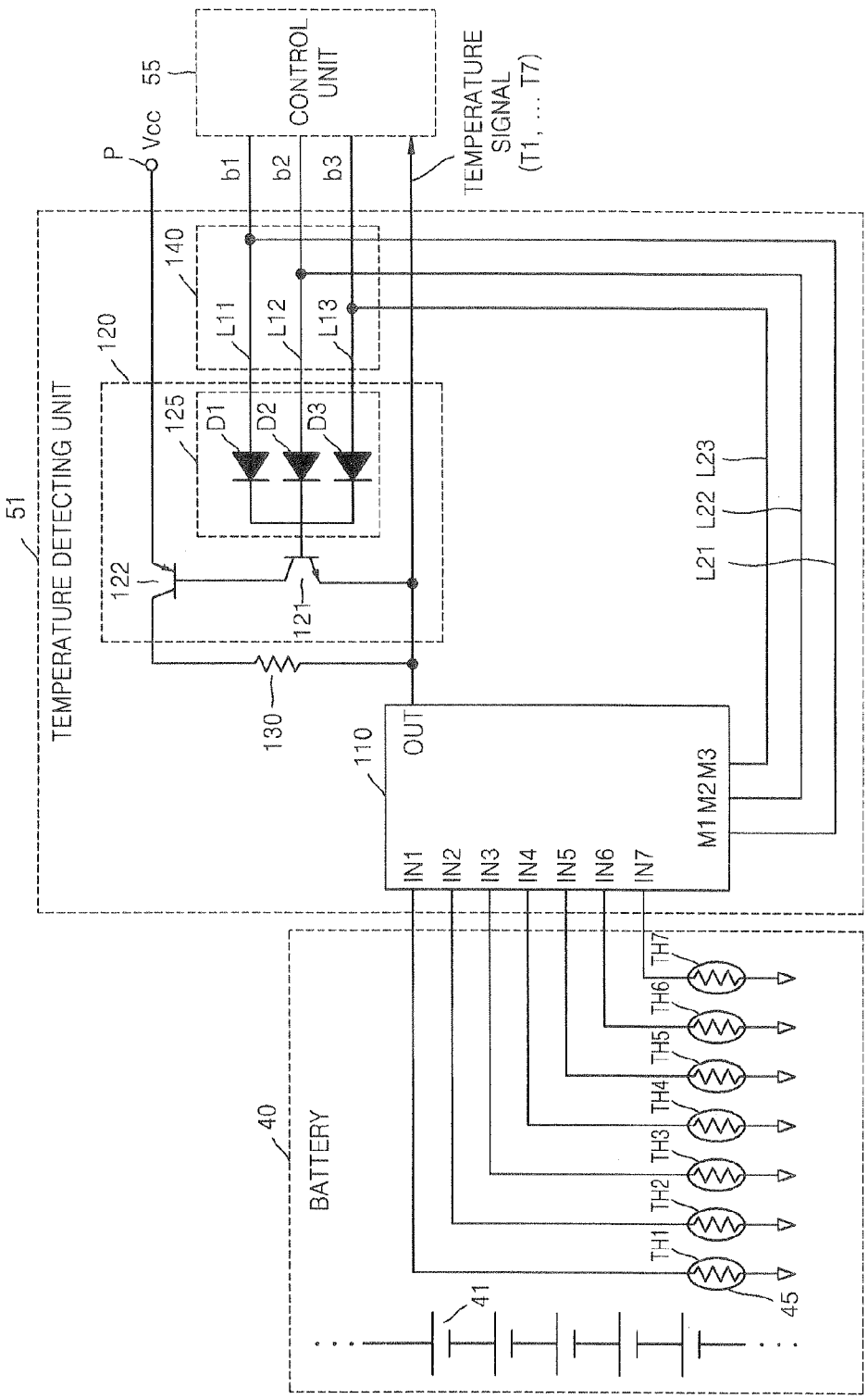
FIG. 3 is a diagram of a detailed configuration of a temperature detecting unit that performs the temperature measurement operation.

FIG. 3 is a diagram of a detailed configuration of the temperature detecting unit 51 that performs the temperature measurement operation. Referring to FIG. 3, the temperature detecting unit 51 includes a control signal input unit 140 to which a control signal $b1b2b3$ is applied; a power switch unit 120 that switches ON/OFF a power voltage Vcc according to the control signal $b1b2b3$; and a multiplexer 110 that performs a selection operation on the thermistors TH1, TH2, TH3, . . . , THn that are to perform voltage distribution by using a pull-up resistor 130 (the pull-up resistor 130 may correspond to a reference resistor in claims) according to the control signal $b1b2b3$.

The control signal $b1b2b3$ that is output from the control unit 55 may be applied to the control signal input unit 140, and may include two or more bits. For example, the control signal input unit 140 may include a terminal (not shown) for configuring an interface with the control unit 55, or may not have a separate terminal but may be formed as data lines L11, L12, and L13 for receiving the control signal $b1b2b3$.

The control signal $b1b2b3$ that is applied to the control signal input unit 140 is delivered to the power switch unit 120 via first transmission lines L11, L12, and L13, and delivered to the multiplexer 110 via second transmission lines L21, L22, and L23. For example, the first and second transmission lines L11, L12, L13, L21, L22, and L23 may be formed as two or more data lines L11, L12, L13, L21, L22, and L23 via which the control signal $b1b2b3$ is delivered. Via the first and second transmission lines L11, L12, L13, L21, L22, and L23, substantially the same control signal $b1b2b3$ is applied to the power switch unit 120 and the multiplexer 110. That is, the power switch unit 120 and the multiplexer 110 are simultaneously controlled according to the control signal $b1b2b3$ that is output from the control unit 55.

The power switch unit 120 includes a calculation unit 125 for generating an output signal by combining the bits of the control signal $b1b2b3$, a first power switch 121 that is turned on or off according to the output signal from the calculation unit 125, and a second power switch 122 for opening and closing a circuit between a power voltage terminal P and the pull-up resistor 130 by operating in conjunction with the first power switch 121.

The calculation unit 125 may receive the bits of the control signal $b1b2b3$ and then may perform an OR operation. In more detail, the calculation unit 125 may include two or more data lines L11, L12, and L13 that receive the bits of the control signal $b1b2b3$, respectively, that are connected in series with diodes D1, D2, and D3, respectively, and that have outputs connected to each other. That is, the diodes D1, D2, and D3 are respectively connected in series on the data lines L11, L12, and L13 that receive the bits of the control signal $b1b2b3$, and outputs of the diodes D1, D2, and D3 are connected to each other and then connected to the first power switch 121.

For example, the diodes D1, D2, and D3 may be connected in parallel on the data lines L11, L12, and L13 that receive the bits of the control signal $b1b2b3$, respectively, and the outputs of the diodes D1, D2, and D3 may be connected to each other and then may perform an OR gate operation. Here, when one of the bits of the control signal $b1b2b3$ has a high-level, regardless of levels of the other bits, the first power switch 121 is turned on, a base current flows in the second power switch 122 connected to a terminal of the first power switch 121, and the second power switch 122 is turned on. For example, the first power switch 121 and the second power switch 122 may be formed as a PNP transistor and an NPN transistor, respectively, and a collector terminal of the first power switch 121 and a base terminal of the second power switch 122 may form a common node.

Accordingly, if any bit of the control signal $b1b2b3$ has a high-level, the power voltage Vcc is supplied to the multiplexer 110. Meanwhile, if all bits of the control signal $b1b2b3$ have a low-level, the first power switch 121 and the second power switch 122 are turned off, and power supply to the multiplexer 110 is cut. For example, the first power switch 121 and the second power switch 122 may be formed as a transistor, such as a Bipolar Junction Transistor (BJT) or a Field Effect Transistor (FET).

The multiplexer 110 selectively connects one of a plurality of thermistors 45 (TH1, TH2, . . . , TH7) included in the battery 40 to the pull-up resistor 130. The pull-up resistor 130 indicates a reference resistor that performs voltage distribution with the thermistors 45 (TH1, TH2, . . . , TH7).

The pull-up resistor 130 is connected to the power voltage terminal P via the power switch unit 120. One end of the pull-up resistor 130 is connected to the power voltage terminal P, and the power voltage Vcc is supplied to the pull-up resistor 130 or is cut according to operations of the power switch unit 120. According to ON/OFF operations of the power switch unit 120, the power voltage Vcc is supplied to the pull-up resistor 130 and one thermistor 45 among the thermistors 45 (TH1, TH2, . . . , TH7), which is selected by the multiplexer 110, so that the voltage distribution is performed between the pull-up resistor 130 and the thermistor 45 selected from among the thermistors 45 (TH1, TH2, . . . , TH7), and then temperature signals T1, T2, . . . , T7 of the thermistors 45 (TH1, TH2, . . . , TH7) are output to the control unit 55 via an output terminal OUT of the multiplexer 110.

Here, the thermistor 45 that receives the power voltage Vcc is selected by the multiplexer 110, and an output signal from the selected thermistor 45 is output to the control unit 55. The multiplexer 110 sequentially selects the thermistors 45 (TH1, TH2, . . . , TH7) according to the control signal $b1b2b3$, so that the temperature signals T1, T2, . . . , T7 of the thermistors 45 (TH1, TH2, . . . , TH7) are sequentially output to the control unit 55.

The control unit 55 obtains state information regarding the battery units 41 from the temperature signals T1, T2, . . . , T7 of the thermistors 45 (TH1, TH2, . . . , TH7), detects an abnormal state such as overheating or detects over charged state, and controls charging and discharging operations of each battery unit 41, in cooperation with the integrated controller 90.

Input terminals IN1, IN2, ..., IN7 of the multiplexer 110 are connected to the thermistors 45 (TH1, TH2, ..., TH7). One ends of the thermistors 45 (TH1, TH2, ..., TH7) are connected to the input terminals IN1, IN2, ..., IN7 of the multiplexer 110, respectively, and the other ends of the thermistors 45 (TH1, TH2, ..., TH7) are grounded.

The multiplexer 110 along with the pull-up resistor 130 sequentially distribute the power voltage Vcc by multiplexing the ends of the thermistors 45 (TH1, TH2, ..., TH7). A voltage that is distributed by a thermistor 45 from among the thermistors 45 (TH1, TH2, ..., TH7), which is selected by the multiplexer 110, is output to the control unit 55 via the output terminal OUT of the multiplexer 110. According to the sequential multiplexing with respect to the thermistors 45 (TH1, TH2, ..., TH7), which is performed by the multiplexer 110, the pull-up resistor 130 and each of the thermistors 45 (TH1, TH2, ..., TH7) form a closed circuit. The closed circuit performs distribution of the power voltage Vcc due to the pull-up resistor 130 and the thermistor 45 that is selected from among the thermistors 45 (TH1, TH2, ..., TH7).

For example, the first through seventh input terminals IN1 through IN7 of the multiplexer 110 are connected to the first through seventh thermistors 45 TH1 through TH7, respectively. The output terminal OUT of the multiplexer 110 may be connected to the control unit 55. The multiplexer 110 configures a closed circuit in which the pull-up resistor 130 and a thermistor 45 are driven by of the power voltage Vcc, wherein the thermistor 45 is selected from among the first through seventh thermistors 45 TH1 through TH7 according to the control signal b1b2b3 that is input to MUX terminals M1, M2, and M3 of the multiplexer 110. Afterward, a voltage that is distributed from the power voltage Vcc by a voltage-dividing resistance of the pull-up resistor 130 and the selected thermistor 45 is output via the output terminal OUT of the multiplexer 110.

The control signal b1b2b3 that is input to the multiplexer 110 sequentially changes a thermistor 45 to be selected from among the thermistors 45 (TH1, TH2, ..., TH7). For example, according to the selection operation by the multiplexer 110, the thermistors 45 (TH1, TH2, ..., TH7) are sequentially connected to the pull-up resistor 130.

For example, the multiplexer 110 may be formed as a logic circuit in which a corresponding relationship between the control signal b1b2b3 and the thermistors 45 (TH1, TH2, ..., TH7) is recorded, wherein the control signal b1b2b3 is output from the control unit 55, and the thermistors 45 are sequentially selected according to the control signal b1b2b3. Table 1 shows an example of the corresponding relationship between the control signal b1b2b3 and the thermistors 45 that are sequentially selected.

TABLE 1

| control signal b1b2b3 | | | selected thermistor 45 | ON/OFF of power switch unit 120 |
|---|---|---|---|---|
| 0 | 0 | 0 | none | OFF |
| 0 | 0 | 1 | first thermistor | ON |
| 0 | 1 | 0 | second thermistor | ON |
| 0 | 1 | 1 | third thermistor | ON |
| 1 | 0 | 0 | fourth thermistor | ON |
| 1 | 0 | 1 | fifth thermistor | ON |
| 1 | 1 | 0 | sixth thermistor | ON |
| 1 | 1 | 1 | seventh thermistor | ON |

For example, when a control signal is a binary number containing three bits, a 000 control signal indicates a state in which the power switch unit 120 is off, and a temperature measurement operation is not performed. 001-111 control signals involve turning on the power switch unit 120, performing the temperature measurement operation, and selecting the first through seventh thermistors 45 TH1 through TH7.

For example, the 000-111 control signals may be continuously changed at regular intervals so as to sequentially change the first through seventh thermistors 45 TH1 through TH7 to be selected by the multiplexer 110. Here, the 000 control signal indicates the multiplexer 110 not to select the first through seventh thermistors 45 TH1 through TH7, and simultaneously indicates an OFF operation of the power switch unit 120. The 001-111 control signals indicate the multiplexer 110 to select a particular thermistor 45 from among the first through seventh thermistors 45 TH1 through TH7, and simultaneously indicate an ON operation of the power switch unit 120.

The number of arranged thermistors 45 may correspond to the number of temperatures to be detected by the battery 40, and the number of control bits for configuring a control signal may be increased or decreased so as to correspond to the number of the thermistors 45 to be controlled.

Although not illustrated in FIG. 3, temperature signals T1, T2, ..., Tn that are output from the multiplexer 110 may undergo appropriate processes including a filter for removing a high frequency noise component, a signal amplifier, and an analog-to-digital (AC-to-DC) converter for converting the temperature signals T1, T2, ..., Tn into digital signals, and then may be input to the control unit 55.

According to an embodiment of the present invention, in the energy storage system 1 including the battery units 41, the temperature measurement operation is performed at the plurality of measurement positions so that current states of the battery units 41 may be exactly detected and then the charging and discharging operations may be precisely controlled. In particular, the energy storage system 1 including the battery units 41 may not exactly detect an overheating state of each of the battery units 41 due to a temperature deviation according to the arrangement of the battery units 41.

In this regard, according to an embodiment of the present invention, the temperature measurement operation is performed at the plurality of measurement positions, so that an exact temperature state of each battery unit 41 is detected, and a driving circuit and a measurement circuit are not separately configured in each thermistor 45 at each measurement position but instead, a single circuit is configured by using the multiplexer 110. By doing so, it is possible to prevent an increase in circuit scale, and to reduce and simplify an entire configuration including circuit devices, wires, and the like.

In this manner, the thermistors 45 share a temperature detecting circuit so that the temperature measurement operation may be more exact, compared to a case in which the driving circuit and the measurement circuit are separately configured in each thermistor 45. For example, in a case where the pull-up resistor 130 for performing voltage distribution with a resistance element of the thermistor 45 is separately formed in each thermistor 45, a deviation error may occur due to a resistance characteristic of the pull-up resistor 130. According to the embodiment of the present invention, the pull-up resistor 130 for performing the voltage distribution with the resistance element of the thermistor 45 is shared between the thermistors 45, so that the deviation error due to the resistance characteristic of the pull-up resistor 130 may be completely prevented.

According to the embodiment of the present invention, the power voltage Vcc is intermittently applied to the thermistors 45 only when the temperature measurement operation is performed, so that it is possible to reduce average power that is consumed by the thermistors 45 from the power voltage Vcc, and to realize low power consumption. That is, the power switch unit 120 for supplying/cutting of power is arranged between the power voltage Vcc and the thermistors 45, and is turned on/off according to the control signal, so that power consumption while the temperature measurement operation is not performed may be prevented.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. An energy storage system, comprising:
   a plurality of battery units;
   a plurality of thermistors for detecting a temperature of the plurality of battery units;
   a multiplexer performing multiplexing on the plurality of thermistors, and the multiplexer electrically connecting a thermistor selected from the plurality of thermistors to a reference resistor which is not any one of the plurality of thermistors;
   a power switch unit being electrically connected between the reference resistor and a power voltage terminal; and
   a control signal input unit receiving a control signal which is applied to both the multiplexer and the power switch unit, and the control signal input unit receiving the control signal having two or more control bits.

2. The energy storage system of claim 1, further comprising a first transmission line for delivering the control signal and extending from the control signal input unit to the power switch unit, and a second transmission line extending from the control signal input unit to the multiplexer.

3. The energy storage system of claim 2, wherein the first transmission line and the second transmission line deliver a substantially same control signal to the power switch unit or to the multiplexer.

4. The energy storage system of claim 2, wherein the first transmission line and the second transmission line comprise two or more data lines for transmitting the control bits, respectively.

5. The energy storage system of claim 2, wherein the first transmission line and the second transmission line diverge from the control signal input unit and extend to the power switch unit and the multiplexer, respectively.

6. The energy storage system of claim 1, wherein the control signal is continuously changed so as to sequentially change a thermistor to be selected by the multiplexer.

7. The energy storage system of claim 1, wherein the control signal indicates the multiplexer to select a particular thermistor, and simultaneously indicates an ON operation of the power switch unit.

8. The energy storage system of claim 1, wherein the control signal indicates the multiplexer not to select a thermistor, and simultaneously indicates an OFF operation of the power switch unit.

9. The energy storage system of claim 1, wherein the power switch unit comprises one or more switches that are turned on or off according to signals representing the control bits.

10. The energy storage system of claim 1, wherein the power switch unit comprises:
    a first power switch being turned on or off according to signals representing the control bits; and
    a second power switch opening and closing a circuit connected between the reference resistor and the power voltage terminal by operating in conjunction with an ON or OFF operation of the first power switch.

11. The energy storage system of claim 10, wherein the power switch unit further comprises a calculation unit combining signals representing the control bits and outputting a calculation signal to the first power switch.

12. The energy storage system of claim 11, wherein the calculation unit receives the control bits and performs an OR operation.

13. The energy storage system of claim 11, wherein the calculation unit comprises two or more data lines that respectively receive each of the control bits, and the two or more data lines are respectively connected in series with diodes and have outputs connected to each other.

14. An energy storage system for supplying power to a load, the energy storage electrically connected to a power generating system and a grid, the energy storage system comprising:
    a battery comprising a plurality of battery units, and a plurality of thermistors detecting a temperature of the plurality of battery units;
    a temperature detecting unit performing multiplexing on the plurality of thermistors, sequentially distributing power voltage, by using a reference resistor which is not any one of the plurality of thermistors, to the plurality of thermistors, and outputting a divided voltage; and
    a control unit being electrically connected to and communicating with the temperature detecting unit,
    wherein the temperature detecting unit comprises:
        a multiplexer performing multiplexing on the plurality of thermistors, and electrically connecting a thermistor selected from the plurality of thermistors to the reference resistor;
        a power switch unit arranged between the reference resistor and a power voltage terminal; and
        a control signal input unit for receiving a control signal which is applied to both the multiplexer and the power switch unit.

15. The energy storage system of claim 14, wherein the multiplexer and the power switch unit receive a substantially same control signal.

16. The energy storage system of claim 14, wherein the power switch unit comprises one or more switches that are turned on or off according to the control signal.

17. The energy storage system of claim 14, wherein the power switch unit comprises:
    a calculation unit combining bits of the control signal and then outputting a signal having a high-level or a low-level;
    a first power switch being turned on or off according to an output from the calculation unit; and
    a second power switch opening and closing a circuit between the reference resistor and the power voltage terminal by operating in conjunction with an ON or OFF operation of the first power switch.

18. The energy storage system of claim 14, further comprising:
    a power converting unit converting a voltage output from a power generating system into a direct current (DC) link voltage;
    a bidirectional converter converting an output voltage of the battery into the DC link voltage or converting the DC link voltage into an input voltage of the battery;
    a DC link unit constantly maintaining a level of the DC link voltage;

a bidirectional inverter converting the DC link voltage into an alternating current (AC) voltage appropriate for the grid, and converting the AC voltage into the DC link voltage; and an integrated controller controlling the power converting unit, the bidirectional converter, and the bidirectional inverter.

19. The energy storage system of claim 18, wherein the integrated controller controls an operation mode with respect to a flow of a current in the energy storage system, and the control unit controls charging and discharging operations of the battery according to a control of the integrated controller.

* * * * *